(12) United States Patent
Ehlert

(10) Patent No.: US 9,915,357 B1
(45) Date of Patent: Mar. 13, 2018

(54) ACTUATOR WITH BACK PRESSURE VALVE

(71) Applicant: TSI Products, Inc., Arlington, TX (US)

(72) Inventor: John H. Ehlert, Dallas, TX (US)

(73) Assignee: TSI Products, Inc., Arlington, TX (US)

( * ) Notice: Subject to any disclaimer, the term of this patent is extended or adjusted under 35 U.S.C. 154(b) by 0 days.

(21) Appl. No.: 14/996,887

(22) Filed: Jan. 15, 2016

Related U.S. Application Data

(60) Provisional application No. 62/118,349, filed on Feb. 19, 2015.

(51) Int. Cl.
*F16K 5/06* (2006.01)

(52) U.S. Cl.
CPC .................. *F16K 5/0605* (2013.01)

(58) Field of Classification Search
CPC ..... F16K 5/0605; F16K 15/044; F16K 15/183
See application file for complete search history.

(56) References Cited

U.S. PATENT DOCUMENTS

| 2,658,714 | A | * | 11/1953 | Fooshee | B65D 83/205 |
| | | | | | 222/394 |
| 2,728,509 | A | | 12/1955 | Peterson | |
| 2,737,037 | A | | 3/1956 | Zellweger | |
| 2,989,091 | A | * | 6/1961 | Lowenthal | F23Q 2/52 |
| | | | | | 141/18 |
| 3,035,617 | A | * | 5/1962 | Breitenstein | B65D 83/75 |
| | | | | | 137/614.04 |
| 3,574,314 | A | * | 4/1971 | Quercia | F23Q 2/52 |
| | | | | | 137/517 |
| 3,583,846 | A | | 6/1971 | Kimball et al. | |
| 3,733,009 | A | | 5/1973 | Rouzier et al. | |
| 3,749,291 | A | * | 7/1973 | Prussin | B65D 83/34 |
| | | | | | 222/402.24 |
| 3,976,110 | A | * | 8/1976 | White | B60H 1/00585 |
| | | | | | 137/614.05 |
| 4,125,124 | A | | 11/1978 | Kah | |
| 4,177,646 | A | | 12/1979 | Guadagnin et al. | |
| 4,177,790 | A | | 12/1979 | Zenzaburo | |
| 4,378,783 | A | | 4/1983 | Hunter | |
| 4,512,587 | A | | 4/1985 | Burke et al. | |
| 4,594,990 | A | | 6/1986 | Batchelor | |
| 4,608,825 | A | | 9/1986 | Fontaine | |
| 5,183,076 | A | * | 2/1993 | Guillin | F16K 15/044 |
| | | | | | 137/513.7 |
| 5,186,201 | A | | 2/1993 | Warren | |
| 5,207,242 | A | * | 5/1993 | Daghe | E03C 1/106 |
| | | | | | 137/454.6 |
| 5,687,777 | A | * | 11/1997 | Dobson | A61M 16/183 |
| | | | | | 141/18 |
| 5,975,490 | A | * | 11/1999 | Essman | F16L 37/28 |
| | | | | | 251/149.4 |

(Continued)

FOREIGN PATENT DOCUMENTS

WO 2014123833 A1 8/2014

*Primary Examiner* — Craig Schneider
*Assistant Examiner* — Frederick D Soski
(74) *Attorney, Agent, or Firm* — Hitchcock Evert LLP

(57) ABSTRACT

An actuator device for a pressurized container incorporating an internal back flow prevention valve. The actuator may include a ball and socket check valve with a resilient component to maintain the ball in a condition to operate as a check valve even when upside-down.

16 Claims, 3 Drawing Sheets

(56) References Cited

U.S. PATENT DOCUMENTS

| | | | |
|---|---|---|---|
| 6,263,911 B1* | 7/2001 | Brown | B05B 15/10 |
| | | | 137/513.7 |
| 6,385,986 B1* | 5/2002 | Ferris | B60H 1/00585 |
| | | | 62/292 |
| 6,446,453 B1* | 9/2002 | Trachtenberg | B60H 1/00585 |
| | | | 62/292 |
| 6,561,237 B1* | 5/2003 | Brass | F16L 29/02 |
| | | | 141/1 |
| 6,609,385 B1 | 8/2003 | Ferris et al. | |
| 6,851,442 B2* | 2/2005 | Knowles | F16L 37/30 |
| | | | 137/1 |
| 6,978,636 B2 | 12/2005 | Motush et al. | |
| 6,981,516 B1* | 1/2006 | VanOsdol | B01D 46/0087 |
| | | | 137/260 |
| 7,077,171 B2 | 7/2006 | Carrubba | |
| 7,341,169 B2 | 3/2008 | Bayer | |
| 8,485,235 B2* | 7/2013 | Cuzydlo | A61M 16/183 |
| | | | 137/614.04 |
| 9,243,829 B1* | 1/2016 | Parnell | F25B 45/00 |
| 2004/0040978 A1* | 3/2004 | Groys | B05B 15/008 |
| | | | 222/52 |
| 2005/0126638 A1* | 6/2005 | Gilbert | F16K 15/044 |
| | | | 137/539 |
| 2005/0217730 A1* | 10/2005 | Doutt | F16K 15/044 |
| | | | 137/539.5 |
| 2009/0223574 A1* | 9/2009 | Montague | E03B 9/16 |
| | | | 137/519.5 |
| 2010/0051119 A1* | 3/2010 | Klein | F16K 15/044 |
| | | | 137/540 |
| 2011/0041522 A1 | 2/2011 | Carrubba | |
| 2011/0290372 A1* | 12/2011 | Dowel | B29C 73/166 |
| | | | 141/37 |
| 2012/0006828 A1* | 1/2012 | Frenal | F16K 1/303 |
| | | | 220/581 |
| 2012/0285556 A1* | 11/2012 | Erb | F16K 17/0406 |
| | | | 137/514.5 |
| 2013/0333770 A1* | 12/2013 | Maita | F02M 59/48 |
| | | | 137/315.41 |
| 2015/0158638 A1 | 6/2015 | Maguire | |
| 2015/0167860 A1 | 6/2015 | Wu | |

* cited by examiner

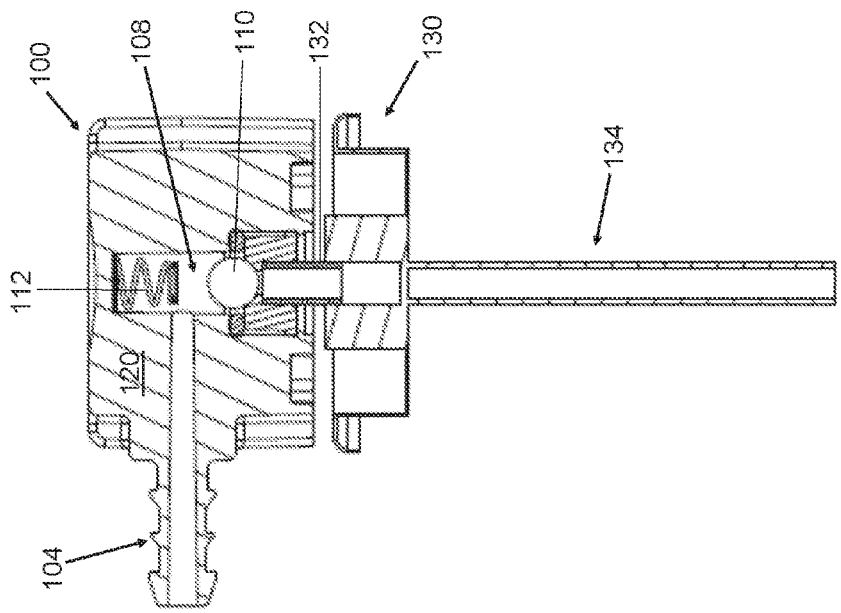
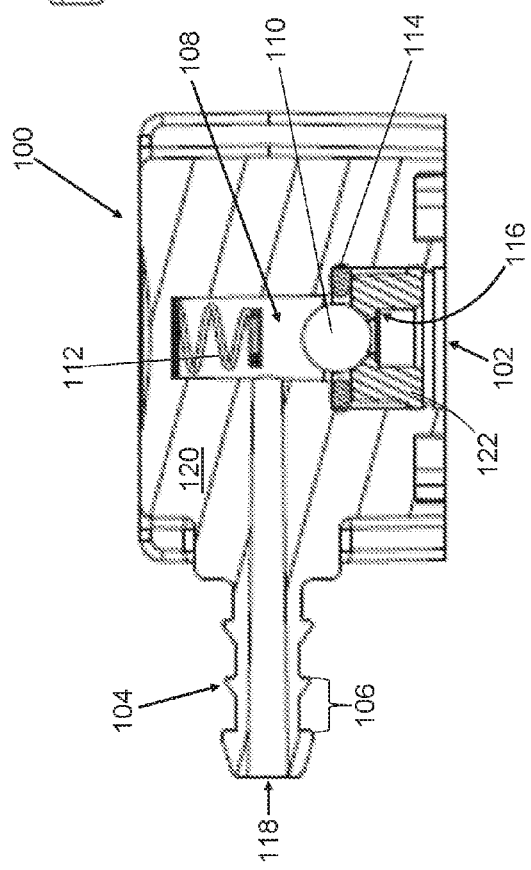

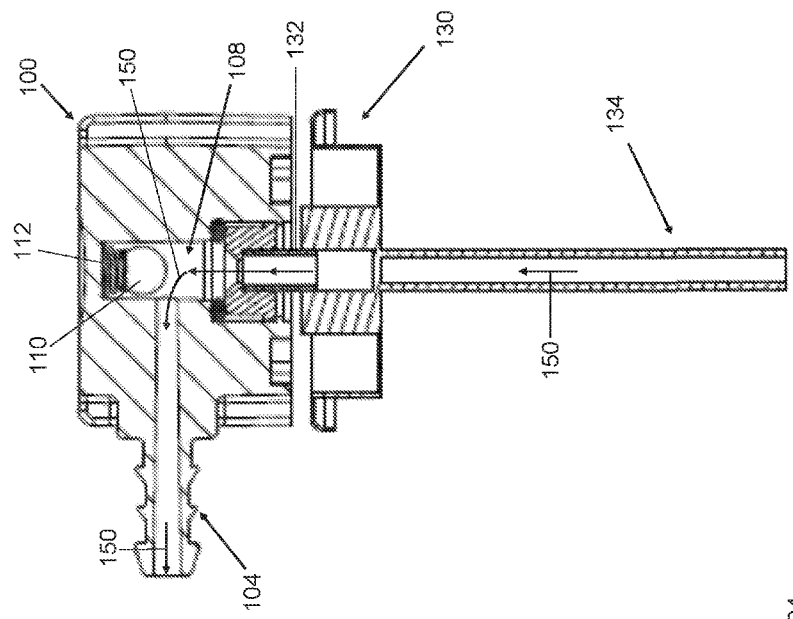
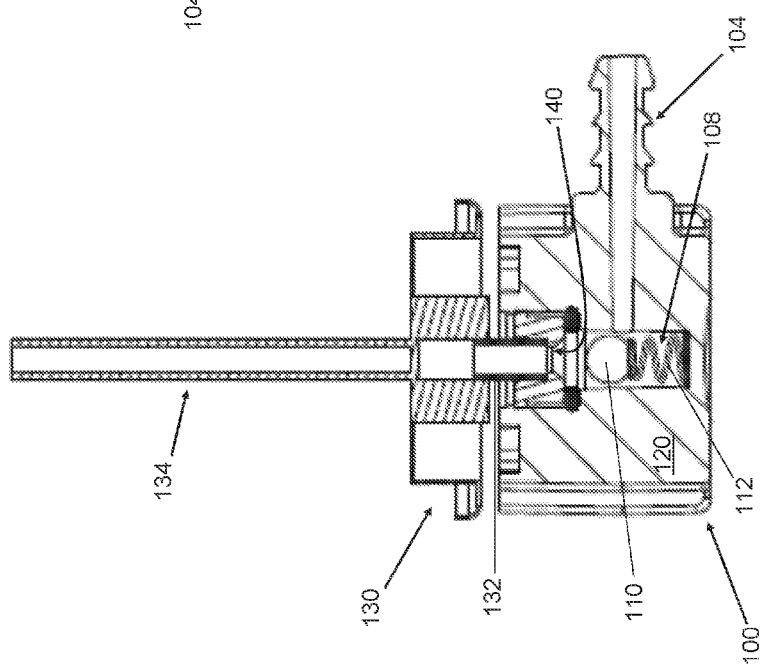

ACTUATOR WITH BACK PRESSURE VALVE

CROSS-REFERENCE TO RELATED APPLICATION

This application claims the benefit of priority from U.S. Provisional Application No. 62/118,349 filed on Feb. 19, 2015, which is incorporated herein by reference.

BACKGROUND

Actuators are used to control the outflow of gas or fluid products from pressurized containers—such as aerosol cans. The actuator is designed to facilitate the gas or fluid flow from the pressurized container to a second location. The actuator may be designed to release the pressurized gas or fluid from an attached container when the actuator is depressed. Accordingly, when a user presses on the actuator, the gas or fluid is released and directed to the second location by the actuator.

In some systems, the secondary location is also a pressurized environment. For example, a vehicle air conditioning system may use a pressurized system containing refrigerant. A pressurized canister of refrigerant may be used to add refrigerant to the vehicle air conditioning system when needed. When a canister is connected to a secondary pressurized source, the secondary pressurized source will provide back pressure into the connections, tubing, and/or actuator components between the pressurized canister and the secondary pressurized source. This back pressure may cause operational problems. For example, the back pressure may cause the actuator to disconnect from the canister. For another example, the back pressure may cause refrigerant to leak through the connection between the canister and the actuator.

SUMMARY

The present disclosure relates to a novel actuator design which incorporates a valve to restrict back pressure from secondary pressure source downstream from the actuator output.

Embodiments of the present disclosure provide for a check valve (or one-way valve) within the design of the actuator which allows fluid flow from the input to the output of the actuator and restricts flow from the output to the input of the actuator. Embodiments may include a check valve design using a shaped component—e.g. a ball—and a fitted socket in which the ball engages to form a seal when a back pressure is applied to the output of the actuator.

Embodiments may include an interior channel between the input and output portions in which a shaped component may move freely when no pressure is being applied in the actuator system. In some embodiments, the ends of the interior channel are defined by a fitted socket proximate to the input port and a resilient component—e.g. a spring—on the opposite end of the interior channel from the input port. The output channel may be fluidly connected to a side of the interior channel at a location between the two ends of the interior channel. In addition, the interior channel may be perpendicular to the output channel in some embodiments.

In some embodiments, a fitted socket for a movable component of the check valve may be incorporated into a valve stem seat component designed to provide a fitted connection to a valve stem extending from a pressurized canister. In some embodiments, the valve stem seat component may be a separate component connected to the actuator body and a seal—e.g. a resilient sealing ring—placed between the actuator body and the valve stem seat component to prevent leaks from between the actuator body and the valve stem seat component.

In some embodiments, the actuator output is connected to a tube which facilitates a sealed connection with a second device to which the gas or fluid under pressure in the canister will be delivered during operation. The second device may be a pressurized device that provides a back pressure into the outlet of the actuator causing the check valve to close restricting back pressure against the valve stem of the canister. In some embodiments, the tube includes or is attached to a connector to facilitate the operable connection with the second device. In some embodiments the connector may be a quick-release connection which allows an easy to operate and secure connection between the tube and the second device.

Embodiments of the actuator may be used in a wide variety of possible applications. For example, embodiments of the actuator may be implemented with a pressurized canister for application to vehicle air conditioning systems, HVAC systems, tire inflators and/or other secondary pressurized devices.

A BRIEF DESCRIPTION OF THE DRAWINGS

Embodiments will now be described, by way of example only, with references to the accompanying drawings in which:

FIG. 1 is a cross-section view of an embodiment of an actuator of the present disclosure;

FIG. 2 is a cross-section view of an embodiment of an actuator of the present disclosure in connection with a canister;

FIG. 3 is an upside-down, cross-section view of an embodiment of an actuator of the present disclosure in connection with a canister;

FIG. 4 is a cross-section view of an embodiment of an actuator of the present disclosure in connection with a canister during operation.

DETAILED DESCRIPTION

Figure 5:
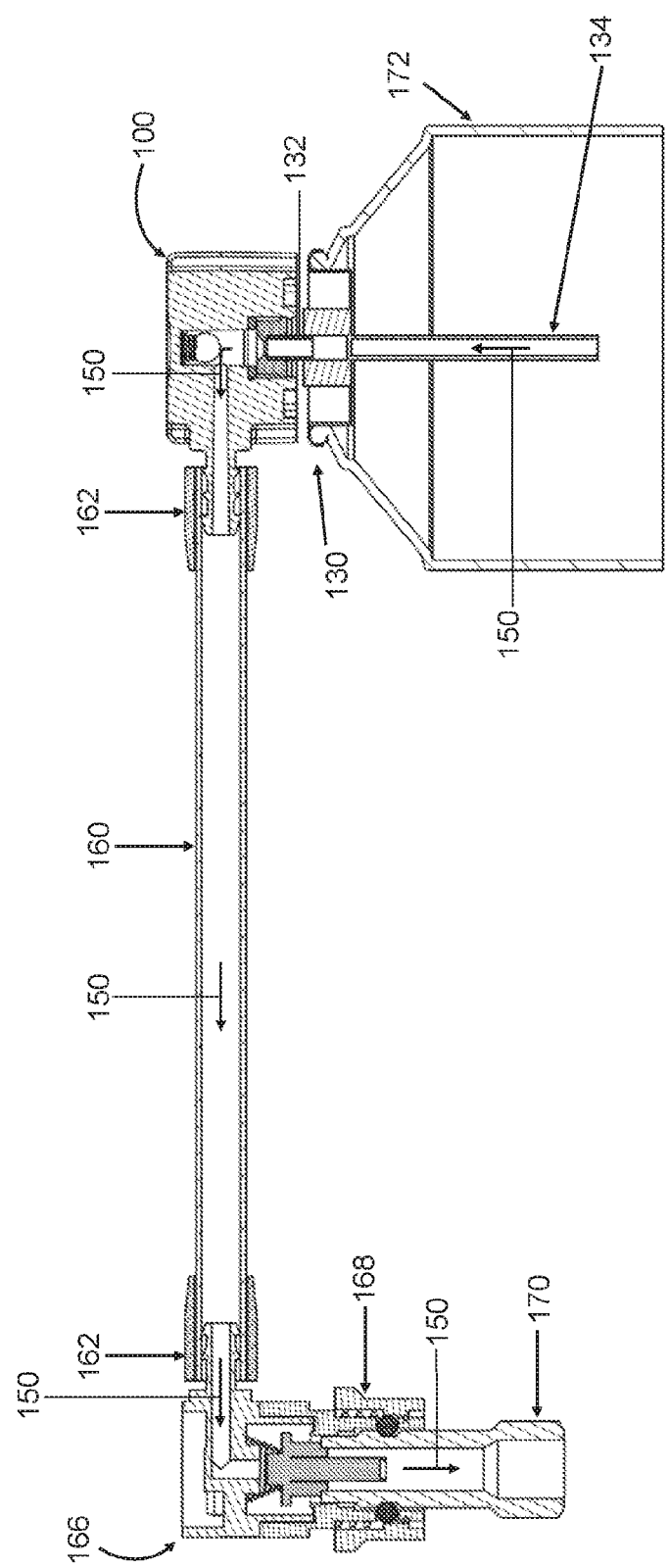
FIG. 5 is a cross-section view of an embodiment of a system utilizing an actuator of the present disclosure.

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein. One skilled in the art will recognize that gas flow and fluid flow may be used interchangeably herein.

FIG. 1 depicts a cross-section of an embodiment of an actuator 100 or the present disclosure. The actuator 100 includes an input port 102 and an output 104. In this embodiment, the input port 102 is dimensioned to fit the output of a pressurized canister (shown in other figures). The output 104 is designed as a force-fit connection which extends within the interior of a tube or other external output component and creates a friction connection. In this embodiment, the output 104 is shown with ridges 106 which improve the operation of the friction connection. One skilled in the art will recognize that the design of the input port 102 and the output 104 may be modified to facilitate alternative options for connecting input and output components such as threaded connections, snap-fit connections, locking connections, etc. In addition, some embodiments of the actuator 100 may be adhered to external input or output components using adhesives or other means of adhering materials such as welding.

The actuator 100 also includes an interior channel 108 which facilitates an air and/or fluid pathway from the input port 102 through the interior channel 108 and exiting the output 104 via output channel 118. In this embodiment, the interior channel 108 is shown in line over the input port 102. The output channel 118 is shown in fluid connection with the interior channel 108 between the top end and bottom end of the interior channel 108. In this embodiment, the output channel 118 is approximately perpendicular to the interior channel 108. In some embodiments, the output channel 108 may extend at an angle between 30 and 90 degrees from the interior channel 108. For example, the angle may be 30, 45, 60 or 90 degrees from the interior channel 108. One skilled in the art will recognize that the orientation between the interior channel 108 and the output channel 118 may vary and remain within the scope and spirit of the invention. In addition, some embodiments may allow the angle between the interior channel 108 and the output channel 118 to be variable.

The actuator 100 includes valve within the interior channel 108 comprising a stopper—shown as ball 110—and a socket 140 (identified in other figures). The stopper—i.e. ball 110—and socket 140 which are dimensioned to fit together and create a seal when pressure is applied to the stopper—i.e. ball 110—opposite of the socket 140. One skilled in the art will recognize that a variety of stopper shapes in conjunction with corresponding sockets may be may be operable as the valve discussed herein. For the purposes of discussion in this disclosure, the stopper will hereinafter be referred to as ball 110 and the socket will be understood as the corresponding shape to form a seal with ball 110 when a pressure is applied to the side of ball 110 opposite the socket.

When the ball 110 is not under an applied pressure, the ball 110 is freely contained within the interior channel 108. Accordingly, the interior channel 108 and the ball 110 are dimensioned such that the diameter of the ball 110 is less that the diameter between the walls defining the interior channel 108. However, the size of the ball 110 in conjunction with the dimensions of the interior channel 108 are sufficient to direct the ball 110 into the socket 140 (identified in other figures) when a backflow pressure is applied through the output channel 118 creating a seal which restricts or prevents the backflow pressure from reaching the input port 102. When a pressure is applied through input port 102, the ball 110 is moved up the interior channel 108 (when the actuator 100 is in this orientation) such that the gas or fluid flow passes through the interior channel 108 and exits the output channel 118.

In this embodiment, the actuator 100 includes a resilient component—shown as a spring 112—within the interior chamber 108 which is operable to hold the ball 110 in a first position when the actuator 100 is at a neutral pressure such that the ball 110 will be forced into the socket 140 if any backflow pressure occurs. In addition, the resilient component will compress when input pressure is applied allowing the ball 110 to move out of the gas or fluid flow path which is exiting the output channel 118.

In some embodiments, the actuator may include a fixed component or structure to hold the ball 110 in a functional position such that a backflow pressure would cause engagement between the ball 110 and socket 140. Such designs may not provide a path with optimal gas and/or fluid flow through the actuator 100 due to the location of the ball 110 in the path.

In the embodiment shown, the housing of the actuator 100 is comprised of an actuator body 120 and an input port body 122 having a seal 114 between the actuator body 120 and the input port body 122. The actuator body 120 defines the output 104, the output channel 118, the interior channel 108 and an opening in which the input port body 122 will connect. The input port body 122 is designed to fit into an opening in the actuator body 120 and includes the input port 102 with a defined seat 116 for the output of a pressurized canister, and the socket 140 (identified in other figures). The seat 116 is shown as the interior extension which is designed to catch a canister output—e.g, a valve stem—and prevent the canister output from passing further into the actuator 100. The socket 140 on the input port body 122 is located opposite the seat 116. The input port body 122 includes a passageway extending through the center of the socket 140 which allows air and/or fluid flow to pass through the input port body 122 into the interior channel 108 of the actuator 100. This passageway becomes sealed when a backflow pressure causes the ball 110 to engage the socket 140. The actuator body 120 and the input port body 122 may be connected through any variety of options for connecting components such as threaded connections, snap-fit connections, locking connections, adhesive connections, etc.

The seal 114 is designed to prevent air or fluid flow from passing between the actuator body 120 and the input port body 122. The seal 114 may be any type of sealing component such as a gasket or a resilient sealing ring. For example, the seal 114 may comprise a resilient O-ring which is compressed when the actuator body 120 and the input port body 122 are connected.

One skilled in the art will recognize that the housing configuration for the actuator 100 may vary and remain within the scope of the disclosure. For example, embodiments of the actuator 100 may use a single housing component whereby the actuator body 120 and the input port body 122 are integrated into a single molded component. In such a design, the seal 114 may not be included. For another example, the design of the actuator body 120 and the input port body 122 may be configured in a different shape whereby the housing comprises a top piece and a bottom piece which are welded together along the exterior wall of the actuator 100. For yet another example, the actuator 100 may be designed from more than two body components— such as an input port body 122, a main body and an output body.

FIG. 2 depicts a cross-section of the embodiment of an actuator 100 shown in FIG. 1 in connection with a pressurized canister output assembly 130. The pressurized canister output assembly 130 may be connected to or integrated with a pressurized canister. In this embodiment, the pressurized canister output assembly 130 is provided for illustrative purposes and a pressurized canister design is not depicted in this figure. One skilled in the art will recognize that the design of the pressurized canister output assembly 130 and/or the pressurized canister may vary and remain within the scope of the disclosure.

The pressurized canister output assembly 130 includes a canister output—referred to herein as valve stem 132—and an internal tube 134. The pressurized canister output assembly 130 may include any type of output trigger mechanism to release the pressurized contents of the canister—such as a depressible valve, a rotation valve, etc. For discussion purposes, the mechanism for the pressurized canister output assembly 130 will be discussed herein as a depressible valve.

This figure illustrates input port 102 of the actuator 100 engaged with the valve stem 132 of the pressurized canister output assembly 130. The valve stem 132 extends into the input port 102 up to the seat 116. The output of valve stem 132 is directly aligned with the passageway through the socket 140. In this embodiment, the actuator 100 may be either at a neutral pressure or under a backflow pressure. When oriented in the vertical position at a neutral pressure, gravity would cause the ball 110 to rest into the socket 140 as illustrated.

Alternatively, when the actuator 100 is under a backflow pressure, the backflow pressure will cause the ball 110 to engage the socket 140 creating a seal. Accordingly, the ball 110 and socket 140 check valve will restrict and/or prevent the backflow pressure from passing through the socket 140 to the valve stem 132 of the canister. In addition, the seal 114 will operate to preclude gas and/or fluid associated with the backflow pressure from leaking out of the actuator 100 between the actuator body 120 and the input port body 122. Between the operation of the seal 114 and the ball 110 and socket 140 check valve, the actuator 100 with limit the likelihood or prevent the actuator 100 from disconnecting from the valve stem 132 and/or leaking pressurized gas and/or fluid from the destination device.

When the actuator 100 is depressed, it will cause the valve stem 132 to actuate thereby causing the release of pressurized contents from the canister—i.e. pressurized gas and/or fluid. The released contents from the canister apply a pressure which is sufficient to overcome the gravitational force and/or the backflow pressure in the actuator 100 causing the ball 110 and socket 140 check valve to open—i.e. moving the ball 110 out of the socket 140—allowing the pressurized contents to flow through the actuator 100 and exit the output channel 118.

FIG. 3 depicts a cross-section of the actuator 100 and the pressurized canister output assembly 130 shown in FIG. 2 in an upside-down orientation. As discussed above, the valve stem 132 extends into the input port 102 to the seat 116. Socket 140 is shown in this figure directly aligned with the output of the valve stem 132 through the passageway in the approximate center of the input port body 122. The socket 140 is defined by the angular surface of the input port body 122 wherein the angular surface is designed to fit the shape and dimensions of the ball 110. One skilled in the art will recognize that the materials used for the ball 110 and the socket 140 may be configured to provide a strong sealed engagement during operation. For example, the ball 110 may be comprised of a resilient material with limited or no gas and/or fluid permeability and the input port body 122 including socket 140 may be comprised of a rigid or semi-rigid material which has limited or no gas and/or fluid permeability. Whereby during operation under a backflow pressure, the ball 110 will compress into the socket 140 creating a seal with limited or no gas and/or fluid permeability.

In this embodiment, the actuator 100 is depicted at a neutral pressure. When oriented in the upside-down position at a neutral pressure, gravity would cause the ball 110 to rest on the spring 112 as illustrated. The spring 112 operates to hold the ball 110 in a position that a backflow of air and/or fluid will direct the ball 110 into the socket 140. While the actuator 100 is under a backflow pressure, the backflow pressure will cause the ball 110 to stay engaged with the socket 140 creating a seal that will restrict and/or prevent the backflow pressure from passing through the socket 140 to the valve stem 132 of the canister.

In addition, the seal 114 will operate to preclude gas and/or fluid associated with the backflow pressure from leaking out of the actuator 100 between the actuator body 120 and the input port body 122. Between the operation of the seal 114 and the ball 110 and socket 140 check valve, the actuator 100 with limit the likelihood or prevent the actuator 100 from disconnecting from the valve stem 132 and/or leaking pressurized gas and/or fluid from the destination device.

When the actuator 100 is depressed, it will cause the valve stem 132 to actuate thereby causing the release of pressurized contents from the canister—i.e. pressurized gas and/or fluid. The released contents from the canister apply a pressure which is sufficient to overcome any backflow pressure in the actuator 100—which, if applicable, causes the ball 110 and socket 140 check valve to open—allowing the pressurized contents to flow through the actuator 100 and exit the output channel 118.

FIG. 4 depicts a cross-section of the actuator 100 and the pressurized canister output assembly 130 shown in FIG. 2 during operation. As discussed above, the valve stem 132 extends into the input port 102 to the seat 116. The output of valve stem 132 is directly aligned with the passageway through the socket 140. In this embodiment, the actuator 100 is at a positive pressure applied by the pressurized canister—e.g. when the contents of the pressurized canister are released. The air and/or fluid flow in this embodiment is illustrated by the arrows 150 showing the direction of travel for the contents of the pressurized canister.

As illustrated, when the positive pressure is applied from the canister into actuator 100, the pressure will cause the ball 110 to engage and compress the spring 112. In this embodiment, the compression of spring 112 allows the ball 110 to move out of the direct path from the input port 102 through the interior channel 108 and exiting the output channel 118. Specifically, the ball 110 is moved by the positive pressure past the fluid connection between the output channel 118 and the interior channel 108. One skilled in the art will recognize that the dimensions and design of the resilient spring 112, the interior channel 108 and ball 110 may vary based upon the intended use and the specific design of the actuator 100.

In addition, the components and/or attributes thereof may be tailored to the specific canister contents and pressures with which they are intended to be used. Embodiments of check valve within the actuator 100 may be tailored reset at certain pressures. For example, the compression or resiliency of the spring 112 may be controlled to ensure the ball 110 is in place to catch a backflow pressure and seal the actuator 100 as the positive pressure provided by the canister diminishes. Accordingly, as the positive pressure reduces, the spring 112 and/or gravity on the ball 110 will force the ball 110 back into a position to operate as a check valve component.

FIG. 5 depicts a cross-section of the actuator 100 as part of a system from the pressurized canister 172 to the second device 170—i.e. the destination device. As discussed above, the pressurized canister 172 includes the pressurized canister output assembly 130 with valve stem 132 which extends into the input port 102 to the seat 116 of actuator 100. The pressurized canister 172 may comprise an aerosol can or other pressurized container designed to release contents under pressure. For example, the pressurized container may be an aerosol can of air conditioning refrigerant for a vehicle, home or commercial air conditioning system. The term refrigerant is used herein to refer to any refrigerant, coolant or other air conditioning substance.

In this embodiment, the output 104 of the actuator 100 is connected to one end of an output tube 160. The second end of output tube 160 is connected to a coupler fitting 166, which attached to the second device 170. The tube 160 is shown in this embodiment connected to the output 104 of the actuator 100 and the input of the coupler fitting 166 by force fit connections 162. One skilled in the art will recognize that alternative options for connecting components such as threaded connections, snap-fit connections, locking connections, adhesive connections, etc. may be implemented and remain within the scope and spirit of the disclosure.

In this embodiment, the output of the coupler fitting 166 uses a quick-connect component 168 that facilitates a quick connection and a quick disconnection between the coupler fitting 166 and the second device 170. In addition, the quick-connect component 168 is designed to provide a secure and sealed connection under the pressurized conditions in which it is used. In this embodiment, the quick-connect component 168 operates by sliding the external portion of the quick-connect component 168 to a first position to allow the coupler fitting 166 to move on or off of the external fitting of the second device 170. When the external portion of the quick-connect component 168 moves to a second position, the coupler fitting 166 is secured to the external fitting of the second device 170. The coupler fitting 166 provides an air and/or fluid pathway between the second device 170 and the tube 160 when secured to the second device 170. In some embodiments, the quick-connect component 168 includes a spring or other component to bias the external portion into the second position. One skilled in the art will recognize that alternative options for connecting components such as threaded connections, snap-fit connections, locking connections, adhesive connections, etc. may be implemented and remain within the scope and spirit of the disclosure.

Similar to FIG. 4, the system is shown in this figure is operating under a positive pressure applied from the pressurized canister 172. The air and/or fluid flow in this embodiment is illustrated by the arrows 150 showing the direction of travel from the pressurized canister 172. A backflow pressure as discussed herein is a pressure caused by air or fluid flow traveling in the opposite direction of the arrows 150.

As shown in this figure, the contents from the pressurized canister 172 flow through the internal tube 134 of the canister 172 and out of the valve stem 132. From the valve stem 132, the contents pass through the actuator 100 (as discussed further above) exiting into the tube 160 from the output channel 118. From the tube 160, the contents proceed through the coupler fitting 166 into the second device 170.

As a process for setting up and using the system for refilling air conditioning refrigerant in a vehicle air conditioning system, the actuator 100 would be attached to the valve stem 132 of a pressurized canister output assembly 130 which is part of a pressurized canister 130 of the proper refrigerant for the vehicle air conditioning system. The output 104 of the actuator 100 would be attached to the tube 160 which is further connected to the coupler fitting 166. The coupler fitting 166 is then attached to an external fitting of the vehicle air conditioning system. Because the vehicle air conditioning system is pressurized, a backflow pressure (flowing opposite of the arrows 150) is applied to the actuator 100. Within the actuator 100, the ball 110 is forced into the socket 140 creating a seal which limits or prevents the backflow pressure from being applied to the valve stem 132 of the canister 172.

To begin the refilling process, the actuator 100 is then depressed causing the pressurized canister output assembly 130 to release pressurized refrigerant through the valve stem 132. The pressurized refrigerant from the canister 172 overcomes the backflow pressure from the vehicle air conditioning system causing the ball 110 to move up within the interior channel compressing the spring 112 and exiting the output channel 118. The refrigerant passes through the tube 160, the coupler fitting 166 and into the vehicle air conditioning system. When the refilling process is complete, the actuator 100 is released causing the pressurized refrigerant to stop flowing from the canister 172 and allowing any backflow pressure to return to the actuator 100. As the backflow pressure returns, it causes the ball 110 and socket 140 check valve to reengage. The coupler fitting 166 is then removed from the external fitting of the vehicle air conditioning system.

One skilled in the art will recognize that the actuator 100 and the described system may be used in applications other than the vehicle air conditioning system illustration provided above. For example, the actuator 100 may also be used for applications relating to commercial and residential HVAC systems, tire inflation and sealing systems and other applications which may use a pressurized canister to apply gas and/or fluid contents into a second pressurized device or system.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the system, device and process described.

The invention claimed is:
1. An actuator comprising:
    said actuator having a housing comprising:
        an input port operable to connect to a canister output of a pressurized canister,
        an interior channel fluidly connected to said input port, and
        an output having an output channel with a first end, which connects to said interior channel at a fluid connection, and a second end opposite said interior channel, wherein said output is connectable at said second end of said output channel to a tube, which is not part of said housing; and
    an internal one-way valve located within said interior channel of said housing which allows fluid flow from said input port to said output and restricts fluid flow from said output to said input port;
    wherein said housing is for causing a release of content from said canister output into said input port when said housing is connected to said canister output and actuated; and
    wherein said housing comprises a main body component and a second body component attached to said main body component and includes a sealing element between said main body component and said second body component, wherein said second body component comprises the input port and a seat for engaging said canister output.
2. The actuator according to claim 1, wherein said fluid connection for said output channel is between a first end of said interior channel which is operably connected to said input port and a second end of said interior channel opposite said input port.

3. The actuator according to claim 2, wherein said output channel extends from said interior channel at an angle of greater than 30 degrees.

4. The actuator according to claim 1, wherein said internal one-way valve comprises a ball within said interior channel and said second body component comprises a socket which is located at a first end of said interior channel and is fitted to said ball such that said ball when engaged with said socket forms a seal to prevent a backflow pressure from said output from reaching said input port.

5. The actuator according to claim 4, wherein said interior channel has a resilient component therein which holds said ball in a first position when said actuator is upside-down, wherein said ball in said first position remains operable to function as a component of the internal one-way valve in conjunction with said socket when said backflow pressure from said output is applied to said ball.

6. The actuator according to claim 5, wherein said resilient component is a spring.

7. The actuator according to claim 6, wherein said ball is freely moveable between said first position and a second position within said interior channel, wherein said moveable ball is in contact with a spring in said first position and is not in contact with said spring in said second position.

8. The actuator according to claim 5, wherein said ball compresses said resilient component when a pressure is applied from said pressurized canister through said input port.

9. The actuator according to claim 8, wherein when said resilient component is compressed, the ball moves beyond the said fluid connection.

10. An actuator comprising:
an actuator housing having an internal check valve comprising:
an input port operable to connect to a valve stem of a pressurized canister;
an interior channel fluidly connected to said input port;
an output having an output channel fluidly connected to said interior channel;
said internal check valve located within said interior channel of said actuator which allows fluid flow from said input port to said output and restricts fluid flow from said output to said input port, comprising a moveable ball and a socket dimensioned to fit said moveable ball and creating a seal when a backflow pressure is applied against said movable ball from said output into said interior channel which is greater than an input pressure applied through said input port,
wherein said moveable ball is freely moveable between a first position and a second position within said interior channel until a fluid flow pressure is applied to said moveable ball; and
wherein said moveable ball is in contact with a spring in said first position and is not in contact with said spring in said second position.

11. The actuator according to claim 10, wherein said actuator housing comprises a main body component and a second body component attached to said main body component and includes a sealing element between said main body component and said second body component.

12. An apparatus comprising:
a pressurized canister having an output trigger mechanism, and
an actuator comprising:
an input port operable to connect to an output of said pressurized canister;
an interior channel fluidly connected to said input port;
an output having an output channel which connects to said interior channel at a fluid connection; and
an internal one-way valve having a moveable ball located within said interior channel which allows fluid flow from said input port to said output and restricts fluid flow from said output to said input port,
wherein said actuator comprises a main body component and a second body component attached to said main body component and includes a sealing element between said main body component and said second body component forming an actuator body, including said interior channel, that is for actuating said output trigger mechanism; and
wherein said moveable ball is freely moveable within said interior channel between a socket and a resilient component, wherein said moveable ball contacts said resilient component in a first position and does not contact said resilient component in a second position.

13. The apparatus according to claim 12, wherein said resilient component is a spring.

14. An actuator comprising:
said actuator having a housing comprising:
an input port operable to connect to an output of a pressurized canister, an interior channel fluidly connected to said input port, and
an output having an output channel with a first end, which connects to said interior channel at a fluid connection, and a second end opposite said interior channel, wherein said output is connectable at said second end of said output channel to a tube, which is not part of said housing; and
an internal one-way valve comprising a ball and a fitted socket which is located within said interior channel of said housing which allows fluid flow from said input port to said output and restricts fluid flow from said output to said input port;
wherein said housing is for causing a release of content from said output of said pressurized canister into said input port when said housing is connected to said output of said pressurized canister and actuated; and
wherein said interior channel has a resilient component therein which holds said ball in a first position when said actuator is upside-down, wherein said ball in said first position remains operable to function as a component of the one-way valve in conjunction with said socket when a backflow pressure from said output is applied to said ball, and
wherein said ball is freely moveable within said interior channel between said fitted socket and said resilient component, wherein said moveable ball contacts said resilient component in said first position and does not contact said resilient component in a second position.

15. The actuator according to claim 14, wherein said ball when engaged with said fitted socket forms a seal to prevent a backflow pressure from said output from reaching said input port.

16. The actuator according to claim 14, wherein said resilient component is a spring.

* * * * *

UNITED STATES PATENT AND TRADEMARK OFFICE
CERTIFICATE OF CORRECTION

| | | |
|---|---|---|
| PATENT NO. | : 9,915,357 B1 | Page 1 of 1 |
| APPLICATION NO. | : 14/996887 | |
| DATED | : March 13, 2018 | |
| INVENTOR(S) | : John H. Ehlert | |

It is certified that error appears in the above-identified patent and that said Letters Patent is hereby corrected as shown below:

In the Specification

Column 2, Lines 10-11: insert --,-- between "close" and "restricting"

Column 2, Line 14: insert --,-- between "embodiments" and "the"

Column 3, Line 21: delete "the output Channel 108" and insert --the output channel 118--

Column 3, Line 39: delete "may be"

Column 3, Line 49: delete "that the diameter" and insert --than the diameter--

Column 6, Line 14: delete "with limit" and insert --will limit--

Column 6, Lines 52-53: insert --the-- between "Embodiments of" and "check valve"

Column 6, Line 53: insert --to-- between "tailored" and "reset"

Column 7, Line 11: insert --is-- between "which" and "attached"

Column 7, Line 43: delete "system is shown" and insert --system shown--

Column 7, Line 49: delete "or" and insert --and/or--

In the Claims

Column 10, Line 61: delete "a backflow" and insert --said backflow--

Signed and Sealed this
First Day of May, 2018

Andrei Iancu
*Director of the United States Patent and Trademark Office*